United States Patent [19]
Dill et al.

[11] 3,861,783
[45] Jan. 21, 1975

[54] LIQUID CRYSTAL DISPLAY FEATURING SELF-ADJUSTING MOSAIC PANEL

[75] Inventors: Hans G. Dill, Costa Mesa; Alex M. Leupp; Darrell M. Erb, both of Newport Beach, all of Calif.

[73] Assignee: Hughes Aircraft Company, Culver City, Calif.

[22] Filed: June 28, 1973

[21] Appl. No.: 374,443

[52] U.S. Cl. .................. 350/160 LC, 317/101 CC
[51] Int. Cl. ........................... G02f 1/28, G02f 1/36
[58] Field of Search ..... 340/324 R, 324 M, 166 EL; 315/169 TV; 313/108 R; 350/160 LC; 178/7.3 D; 317/167 CC

[56] References Cited
UNITED STATES PATENTS
3,716,290   2/1973   Borel et al. .................. 315/169 TV
3,765,011   10/1973  Sawyer et al. ................ 340/324 M Primary Examiner—David Smith, Jr.
Attorney, Agent, or Firm—W. H. MacAllister; J. E. Szabo

[57] ABSTRACT

A large liquid crystal display is formed by combining a plurality of semiconductor wafers carrying an X Y array of reflective back electrodes with a single large transparent front electrode.

8 Claims, 4 Drawing Figures

LIQUID CRYSTAL DISPLAY FEATURING SELF-ADJUSTING MOSAIC PANEL

BACKGROUND OF THE INVENTION

The present invention relates generally to liquid crystal displays, and more particularly to a liquid crystal display of the type wherein a plurality of reflective electrodes are formed upon a semiconducting substrate containing switching transistors for actuating selected ones of the reflective electrodes.

In copending application Ser. No. 352,397 filed by Hans G. Dill et al. on Apr. 18, 1973, and entitled Liquid Crystal Display System with Integrated Signal Storage Circuitry, there is described a liquid crystal display panel, one of whose unique features is that it includes a semiconductor wafer as a backplate which serves not only to support an array of reflective electrodes but which is also adapted to have fabricated therein a plurality of switching transistors for controlling the selective actuation of those electrodes. At the current state of semiconductor wafer fabrication technology, the size of the wafer which might be employed to fabricate a display of the above type is limited to approximately three inches across. Of course, the larger the wafer, the more brittle and subject to breakage it will be and the more likely it is that some of the switching transistors which have been fabricated in it will prove to be defective.

It is, therefore, an object of the present invention to provide a large liquid crystal display panel by forming a mosaic from a plurality of interconnected semiconductor wafers.

An additional and more specific object of the present invention is to provide an arrangement for interconnecting the row and column drive lines carrried by the individual wafers for the selective actuation of its electrodes.

A problem inherent in the approach outlined above is that the typical thickness of a semiconductor wafer is several times larger than the desired spacing between the surface of that wafer and the transparent electrode which is located parallel to the collective surface of the several wafers. As a result, variations in thickness, which will occur between wafers, would cause a significant variation in the spacing between the transparent front electrode and the electrodes carried by various ones of the wafers if the wafers were to be supported by a common, solid, flat backing plate, a practice which would be suggested by the present construction of liquid crystal displays.

It is, therefore, a further object of the present invention to provide a liquid crystal display which, although comprised of a plurality of semiconductor wafers of varying thicknesses, has a uniform spacing between the active surfaces of all of the semiconductor wafers and the common transparent electrode which faces all of those wafers.

These and other objects of the invention are accomplished by a liquid crystal display panel comprised of a transparent front plate having a transparent electrode thereon and spaced from the front plate, a plurality of semiconductor wafers arranged side-by-side to form a coplanar array parallel to the front plate. Each wafer carries an array of reflective electrodes over one of its surfaces which faces the front plate and, to maintain the electrodes of all of the wafers uniformly spaced from the transparent front electrode, preferably each of them includes a spacer structure of uniform height, which extends from the wafer into abutment against the transparent front plate. The semiconductor wafers rest upon a backing plate which extends parallel to and is maintained a fixed distance from the transparent front plate.

To compensate for the inherent possible variations in the thicknesses of the various wafers, a compressable sheet of insulating material extends along the back faces of the wafers, between the wafers and the backing plate. A plurality of flexible conducting pads are provided on the sheet of insulating material to establish contacts between adjacent ones of the semiconducting wafers. This is particularly useful where the reflective electrodes carried by the wafers are arranged in an array of rows and columns, with X and Y drive line segments being carried between the rows and columns of electrodes for their selective actuation. The drive line segments for a given row of electrodes on all of a given row of wafers may be connected to form a single drive line by means of the flexible conducting pads, which in accordance with the invention are so located on the flexible insulating sheet as to provide a bridging connection between the corresponding drive line segments of adjacent ones of the semiconducting wafers.

In keeping with the invention, the flexible conductors comprise a patterned metal layer which is adherent to and is flexible with the insulating sheet so as to maintain the proper contact between adjacent wafers, even when their thicknesses are different.

Further objects and features of the invention will become apparent from the following description and drawings in which.

Figure 1:
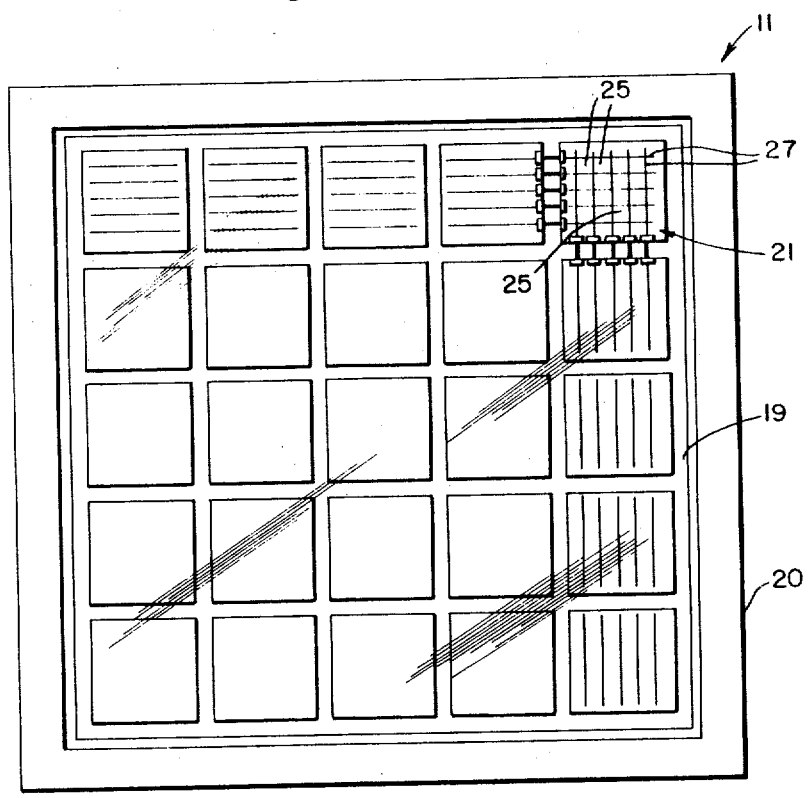
FIG. 1 is a plan view of a display panel fabricated from a mosaic of smaller semiconductor wafers.

Referring now to the figures, a liquid crystal display panel is illustrated in all four of the figures, and reference will be made to them collectively, except as otherwise noted. The exemplary illustrated display 11 includes a rigid backing plate 13 and a transparent front plate, typically glass 15, having a single transparent front electrode 17 on its inside surface. A film of nematic liquid crystal material 16 extends between the front and back plates 13 and 15 and is confined between them by a peripheral seal 19. A clamp 20 which also extends peripherally around the display holds the backing plate 13 at a fixed distance relative to the front plate 15. Arranged in a mosaic pattern between the back and front plates 13 and 15 is a plurality of reflective electrode assemblies 21. Each such assembly is comprised basically of a semiconductor substrate 23, which may be on the order of 2 inches square and 12 mils thick, and carrying on its upper surface an array of reflective electrodes 25 arranged in equally spaced apart columns and rows.

Also formed on the front surface of each semiconductor wafer 23 is a plurality of X and Y drive line segments 33 and 35. These line segments extend along respective rows and columns of electrodes 25 and are connected to them through switching transistors in such a manner that any electrode may be energized by an appropriate connection to the X and Y drive line segments extending along the row and column in which that electrode is located. In the type of display for which the present invention is primarily intended, the switching transistors are integrated with the semiconductor substrate 23. Indeed, it is the need to so integrate the switching transistors, which leads to the use of semiconductor materials for the substrate 23.

A technique for integrating field effect transistors with a back electrode assembly 21 is described in detail and claimed in the above-referenced Dill et al. application, which is incorporated by reference hereby. A detailed description of that technique is not necessary in the present application, since it does not form a part of the present invention. It is appropriate to note, however, that the semiconductor wafer 23 is preferably silicon and that the switching transistors are insulated gate field effect transistors commonly known as IGFETs.

Through a series of steps, which is by now standard procedure in the semiconductor fabricating arts, an IGFET is formed in the surface of the silicon substrate 23 near each intersection of the X and Y drive line segments 33 and 35 so that each switching transistor is disposed under a respective one of the reflective electrodes 25. Each such transistor has its source connected to the reflective electrode 25 under which it is located and its drain and gate connected to respective ones of the X and Y drive line segments 33 and 35 near the intersection of which it is located. Thus, by energizing a particular pair of the drive line segments 33 and 35, the necessary connections are made to the gate and drain of the transistor located near their intersection to complete a circuit through that transistor to the electrode 25 under which the transistor is located. Also described in the above-referenced application is the fabrication in the semiconducting substrate under each electrode 25 of a capacitor plate which together with the reflective electrode 25 serves as a storage capacitor for applying electrical energy across the liquid crystal cell immediately above the reflective electrode 25 even after removal of the drive voltage from the electrode. The latter features serves to permit the display to be scanned at high rates with the information which is to be displayed.

In order to maintain uniform spacing between the reflective electrodes 25 of all of the back electrode assemblies 21, each assembly is provided with a spacer lattice 27. Each lattice is made up of a set of intersecting walls, each extending between adjacent columns and rows of reflective electrodes 25. A method of fabricating a reflective electrode assembly, having such a spacer lattice is described in Leupp et al. application Ser. No. 375,444 filed on even date herewith and entitled Method of Fabricating Back Panel for Liquid Crystal Display.

Since it is not essential that a spacer lattice of the particular type described in the referenced Leupp et al application be used, it will not be described in detail but instead, that application is hereby incorporated by reference. Suffice it to say that the spacer lattice 27 may be conveniently formed after the switching transistors and reflective electrodes 25 have been fabricated. The necessary steps include the deposition of an oxide layer over the entire surface of the wafer 23 and over the reflective electrodes 25. Next, a layer of aluminum is deposited over the just formed oxide layer. Then, by known photoresist masking and etching techniques, the portions of the just deposited aluminum layer, which are over the reflective electrodes 25, are etched away, leaving an aluminum pattern in the form of a lattice whose walls extend between adjacent rows and columns of electrodes 25 and whose interstices correspond with the reflective electrodes.

The aluminum pattern is then anodized to render it resistant to interaction with the liquid crystal material, after which the exposed portions of the oxide layer are removed by means of a second etchant, using the anodized aluminum pattern as a mask. This leaves a two-layered spaced lattice having an oxide base 29 and an anodized aluminum top 31 as illustrated in FIG. 4.

Figure 2:
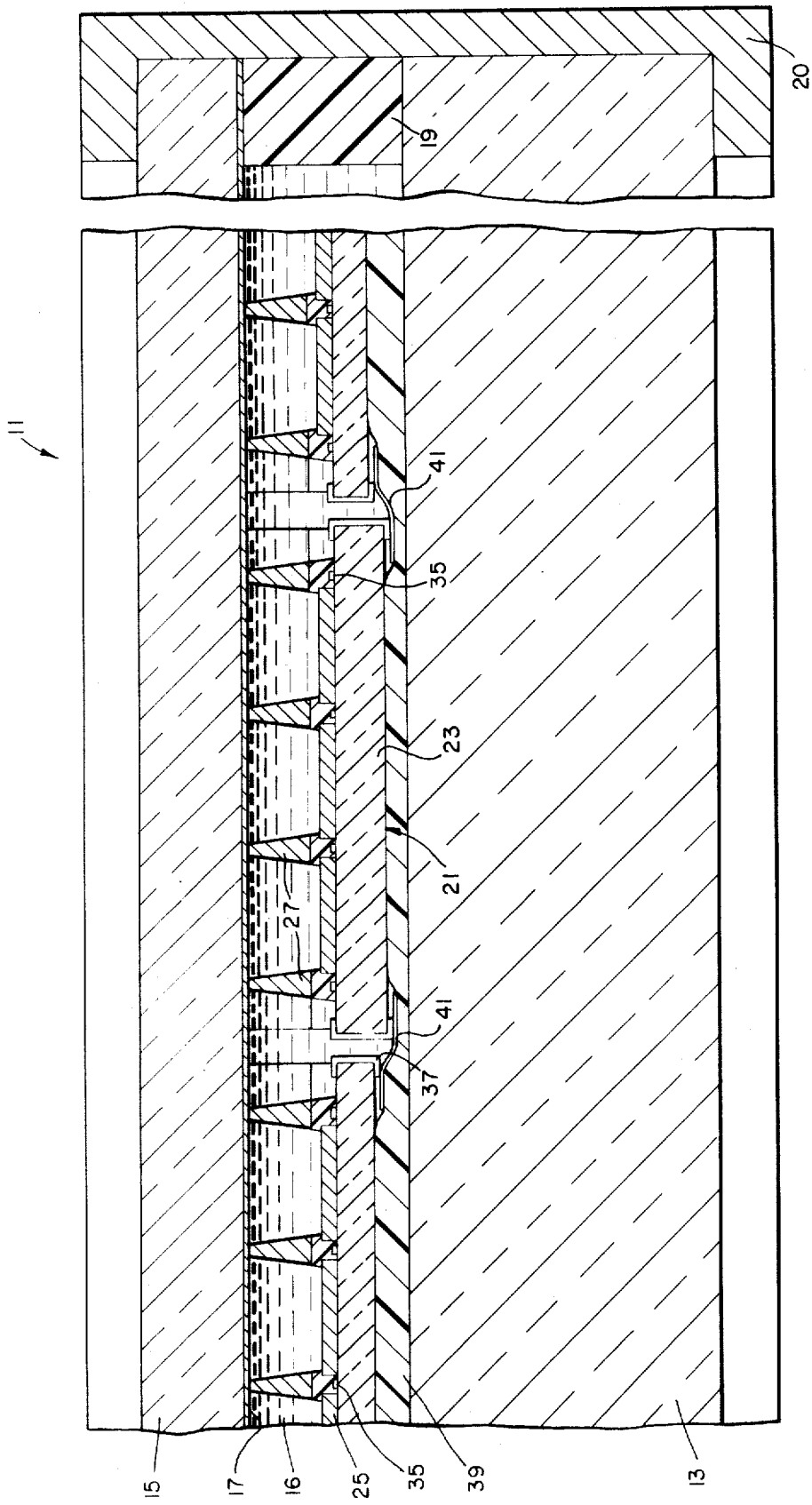
FIG. 2 is a cross section through the panel illustrated in FIG. 1 showing how the spacing between several individual semiconductor wafers and the common transparent electrode is maintained constant by the present invention in spite of variation in thicknesses of the wafers.
Figure 4:
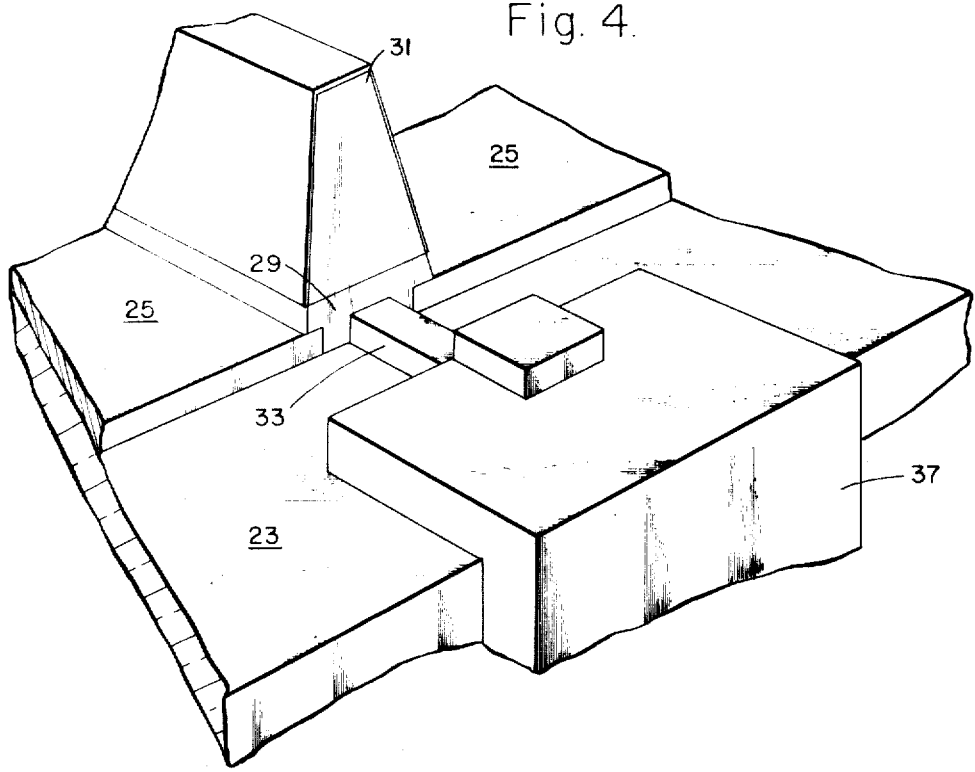
FIG. 4 is an enlarged view of a small portion of the FIG. 3 illustration to show in greater detail the interconnection between one of the drive line segments on a given wafer and the edge connector of that wafer, which is associated with the illustrated drive line segment.

It will be noted that the X and Y drive line segments 33 and 35 are buried in the bases of the walls which make up the spacer lattices 27 as best shown in FIGS. 2 and 4. What is important to note with regard to the spacer lattices is that each lattice is uniform in height throughout the width and length of a particular assembly 21 and that all of the spacer lattices associated with the respective assemblies 21 have the same height. This can be precisely achieved by properly monitoring the deposition of the layers which make up the spacer lattices for the various assemblies. As a result, the spacing between all of the reflective electrodes 25 of the various electrode assemblies 21 and the common transparent front electrode 17 will be uniform. A suitable spacer height will be of the order of 5–10 microns, of which the bottom 1–2 microns will be oxide and the rest aluminum.

As just explained, it is an important feature of the invention therefore, that the distances of all electrode assemblies 21 from the front electrode 17 is determined by spacers between the front electrode 17 and the electrode assemblies 21. In keeping with this aspect of the present invention, provision is made to permit this type of spacing by allowing for the inherent variation in the thicknesses of the various semiconductor wafers 23. Toward this end, a compressable means, preferably a sheet of insulating material 39, is provided between the wafers 23 and the backplate 13. Thus, as illustrated in FIG. 2, the inherent variation in the thicknesses of the several wafers 23 is compensated by the differential compression of the compressable material 39.

To establish continuity between the corresponding X and Y drive line segments of the individual reflective electrode assemblies 21, contacts are provided on the bottom faces of the wafers 23 with means to connect each contact to one end of a respective one of the X and Y drive line segments 33 and 35. In the exemplary embodiment both of these functions are performed by edge connectors 37, which have a top portion connected to one end of the respective one of the X and Y drive line segments 33 and 35, an intermediate portion which extends around the edge of the wafer 23, and a bottom portion which forms the contacts mentioned previously. Means are also provided between the assemblies 21 and the compressable insulating sheet 39 to connect the bottom contacts of adjacent reflector assemblies 21 associated with segments of corresponding X and Y drive line segments 33 and 35.

In accordance with yet another feature of the present invention, the means for establishing a connection between corresponding contacts of adjacent reflector assemblies 21 are comprised of a plurality of flexible conducting pads 41 on the flexible sheet 39 in registry with the corresponding X and Y contacts 37 of adjacent pairs of the wafers 23. It may be seen from FIGS. 2 and 3 that each conducting pad is typically rectangular in shape, its length being shown in FIG. 2 to be sufficient to establish a bridging contact between adjacent edge connectors 37 and from FIG. 3 their width being slightly greater than that of the edge connectors to make the wafer location noncritical. As seen from FIG. 2, the conducting pads 41 conform readily to the irregular shape which is impressed upon the compressible sheet 39 by adjacent wafers 23 of unequal thickness. As a result, continuity between the corresponding X and Y drive line segments is maintained.

To fabricate the plurality of flexible connectors 41 having the proper position on the insulating sheet 39, it is preferable to deposit a layer of a conducting material, preferably gold, ½ to 2 mils thick, on a suitable insulating sheet, such as that sold by DuPont Corporation, under the trademark KAPTON, which may be 3 to 5 mils thick. KAPTON is a polyimide film synthesized by a polycondensation reaction between an aromatic tetrabasic acid and an aromatic amine.

Figure 3:
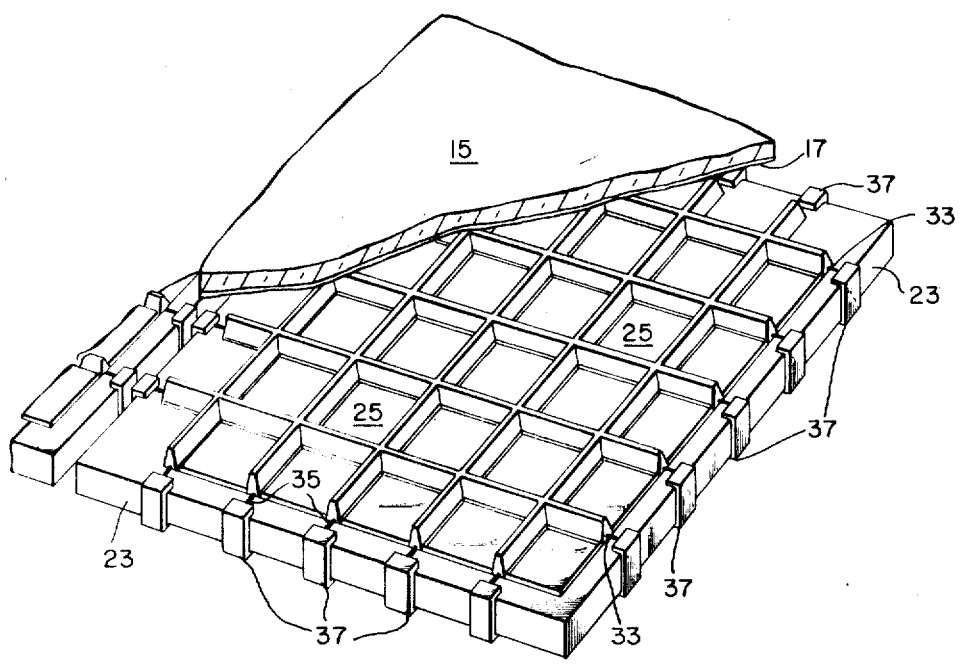
FIG. 3 is a perspective view, partially broken away, of the panel illustrated in FIG. 1.

The gold layer may be deposited upon the KAPTON sheet by vacuum deposition, or it may be plated. In the latter case a thin layer of graphite would be first deposited on the KAPTON to form an electrode, after which the gold may be plated thereon. Once the layer of gold has been formed on the sheet of KAPTON, a photoresist pattern is formed by standard techniques on the gold layer so as to protect the area where the connectors 41 are to be formed. The remaining gold areas are exposed and are etched away by a suitable etchant, such as cyanide dissolved in de-ionized water heated to 45°C. After the etching, the photoresist is removed and what is left is a patterned metal layer having a rectangular array of individual flexible conductors 41 distributed around the edges of the respective reflector assemblies 21 and their wafers 23 as shown in FIGS. 1 and 3.

The sheet 39 thus formed with the pattern of conductors 41 thereon is placed on the backplate 13. The group of reflector assemblies 21 is put in place on top of the sheet with their connectors 37 engaging the flexible connectors 41, after which the peripheral spacer 19 is put into place. Nematic liquid crystal material 26 is then added, and finally the front plate 15 is sealed in placed to complete fabrication of the liquid crystal panel 11.

By means of feedthrough connectors (not shown) which may be provided in the edge spacer 19 or in the backplate 13, X and Y drive signals may be applied to the edge connectors 37 of the left column and bottom row of reflector assemblies 21. Contact from the feedthrough connectors extending through the spacer 19 or through the bottom plate 13 to the edge connectors 37 of these assemblies 21 may be made through their associated flexible conductors 41 which for the left-hand column and bottom row of assemblies may extend to such feedthrough connectors. Y drive signals reaching the edge connectors 37 of the bottom row of assemblies 21 will be fed through the composite Y drive lines formed of the edge connectors 37, drive line segments 35 and flexible connectors 41 to the reflective electrodes 25 situated on the assemblies 21 located in the other rows. Similarly, electrodes 25 situated on all columns of assemblies 21 will receive an X drive signal through the composite X drive lines formed of the flexible connectors 41, the edge connectors 37 and the X drive line segments 33.

From the above, it may be seen that there has been provided, in accordance with the present invention, a liquid crystal display which benefits from the use of a semiconductor wafer wherein its switching transistors may be formed, but without suffering from the size limitations which are normally imposed by the use of such a semiconductor wafer.

What is claimed is:

1. A liquid crystal display panel comprising in combination:
   a. a transparent front plate having a transparent electrode thereon;
   b. a plurality of semiconductor wafers arranged side-by-side to form a coplanar array, each having
      1. a plurality of electrodes distributed over one of its faces,
      2. a spacer structure of uniform height extending from said one of its faces into abutment against said front plate, and
      3. contacts on the opposite one of its faces and means for operatively connecting said plurality of electrodes to said contacts;
   c. a backing plate extending parallel to and maintained a fixed distance from said front plate;
   d. a flexible insulating sheet compressed between the said opposite faces of said wafers and said backing plate; and
   e. a plurality of flexible conducting pads on said insulating sheet located to provide a bridging contact between contacts of adjacent ones of said wafers, whereby random variations in wafer thickness are compensated by differential compression of said insulating sheet;
   f. a nematic liquid crystal material confined between said front and back plates.

2. The liquid crystal display panel of claim 1 characterized further in that said electrical contacts comprise a plurality of edge connectors which extend around the edges of said wafers from said one surface to said opposite surface.

3. The liquid crystal display panel of claim 1 characterized further in that:
   a. said plurality of electrodes on each said wafer is arranged in an ordered array of spaced apart columns and rows,
   b. said means for operatively connecting includes a set of individual X and Y drive line segments running along said one surface of said wafer between said columns and rows of electrodes and means for establishing electrical contact between the respective ends of said drive line segments on said one surface and a respecstive pair of said contacts on said opposite surface, and
   c. said conducting pads are located on said flexible sheet in registry with the corresponding X and Y electrical contacts of adjacent pairs of said wafers so as to establish continuity between corresponding X and Y drive line segments of said adjacent wafers.

4. A liquid crystal display panel comprising in combination:
   a. a transparent electrode and means for maintaining it flat and rigid,
   b. a plurality of four-sided semiconductor wafers arranged side-by-side, parallel to and equally spaced from said electrode, said wafers randomly varying in thickness and having electrodes facing said transparent electrode,
   c. a backing plate extending parallel to and maintained a fixed distance from said transparent electrode,
   d. compressable means extending between said wafers and said backing plate to compensate for said random wafer thickness in variation, and
   e. means including flexible conductors between said flexible means and said wafers, for establishing common electrical connections to the electrodes of several of said wafers,
   f. a nematic liquid material confined between said backing plate and said transparent electrode.

5. A liquid crystal display panel in accordance with claim 4 and characterized further in that:
   a. said flexible means is in the form of a common insulating sheet extending under a plurality of said wafers, and
   b. said flexible conductors comprise a patterned metal layer adherent to and flexible with said sheet.

6. A liquid crystal display panel in accordance with claim 4 and characterized further in that said wafers have:
   a. arrays of electrodes arranged in mutually aligned columns and rows so as to collectively form a single, large coplanar array of such electrodes,
   b. row and column drive line segments operatively connected to said electrodes and arranged in mutually aligned columns and rows so as to collectively form parts of row and column drive lines for each row and each column of said large array, and
   c. said display panel being further characterized in that said flexible conductors are positioned to provide bridging contacts between the column and row drive line segments of adjacent ones of said wafers.

7. A liquid crystal display panel in accordance with claim 6 characterized further in that said drive line segments extend along the top surfaces of said wafers and terminate in edge connectors which extend around the four edges of said wafers to their bottom surfaces.

8. A liquid crystal display panel in accordance with claim 7 and characterized further in that said flexible means is in the form of a common sheet extending under said wafers and said flexible conductors are comprised of a patterned metal layer carried by such sheet, elements of said patterned metal layer underlying the edges of said wafers.

* * * * *